Patented June 12, 1928.

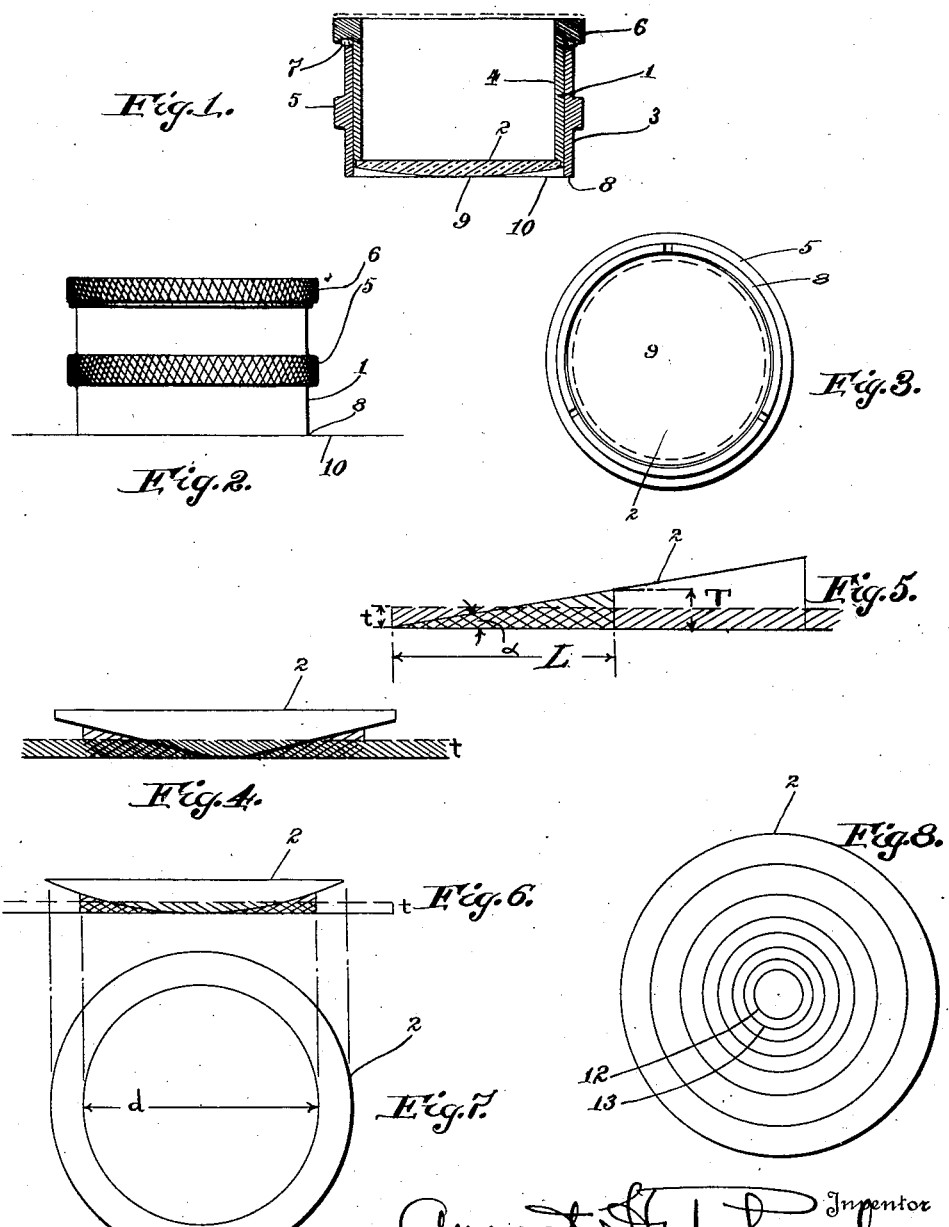

1,673,266

UNITED STATES PATENT OFFICE.

AUGUST HERMAN PFUND, OF BALTIMORE, MARYLAND.

MEASURING DEVICE.

Application filed October 23, 1920. Serial No. 419,114.

The applicant's prior Patent #1,468,075 of September 18th, 1923, describes an instrument for measuring the thickness of paint or any coating necessary to hide or cover any particular surface being tested.

The object of the present invention is to provide an instrument by which the thickness of a coat of paint or any coating material applied in any manner by a machine or by hand, can be measured. This varies not only with the nature of the paint and the brush but with the habit of the painter if it is applied by hand. In fact, experiments tend to show that the work of each painter as to the thickness of coat applied is fairly uniform. In this connection, it should be understood that a single coat of paint is of such minute thickness and contains so many small irregularities that to measure it by means of an ordinary engineer's scale, is wholly impracticable. The present instrument takes a measurement which is based on the quantity of paint deposited on a given area, at the same time reading either directly or indirectly in terms, of the thickness of the coat. Having determined by the instrument described in the previous application or otherwise, the thickness of paint necessary to hide the surface to be painted, it is only necessary, in order to determine the number of coats to be applied, to measure a single coat on any given preferably non-absorbent surface, and by simple mathematics calculate the number of coats necessary.

The present instrument consists of a preferably transparent member as a lens or meniscus, having a convex and regularly curved or inclined face; that is spherical or conical or frusto-conical, or otherwise of known convexity, which term is intended to include angular as well as curved surfaces. The lens or meniscus may be graduated on a scale to be determined as hereinafter described or it may be used independently of such graduations, the necessary measurements being made by means of an ordinary engineer's scale, or other suitable measuring instrument. In addition to the lens, the instrument includes means for supporting the lens in a predetermined relation to the painted surface, preferably including means for guiding it so that a predetermined point or portion of the lens or meniscus may be brought into contact with the painted surface, pressing or folding the paint, which is necessarily measured in soft or unset condition, back upon itself, giving an increased zone of contact of the convex surface with the paint, which is determined by a constant, i. e., the convexity of the surface and a variable i. e., the thickness of the coat of paint, making it possible by measuring the diameter of the zone of contact and utilizing the known constant representing the convexity, to determine the variable, which, as aforesaid, is the thickness of the coat of paint.

In the accompanying drawing, I have illustrated an instrument constructed in accordance with my invention and I have also shown diagrammatically the method and principle of operation.

In the drawings:

Figure 1 is a vertical central section of the instrument.

Figure 2 is an elevation of the same.

Figure 3 is a bottom plan.

Figure 4 is a view of a frusto-conical lens illustrating a modified form of the invention.

Figure 5 is a diagrammatic view illustrating the manner of measuring the thickness of a coating of soft material by means of an inclined surface brought in contact with the surface coated.

Figure 6 is a sectional elevation showing a convex lens in contact as to the center of its convex surface with a flat surface covered with soft coating material and illustrating the displacement of the coating material which appears in section. For purposes of illustration the coating material outside the circle of displacement has been removed.

Figure 7 is a bottom plan of the lens also showing the circle of contact between the lens and the displaced material.

Figure 8 is a diagrammatic view illustrating a feasible method of graduation.

Referring to the drawings by numerals:

An instrument, as illustrated in Figures 1, 2 and 3, consists of a positioning and supporting member, 1, and a downwardly convex, preferably transparenet member, 2.

In the form illustrated, the positioning or supporting member, 1, consists of two telescoping tubular parts comprising an external guide, and surface contacting element, 3, and an internal or lens carrying element, 4, which arrangement is capable of considerable variation. The contacting element, 3, has a knurled gripping portion, 5, and the internal lens carrier, 4, has a projecting rim or flange, 6, which extends outward, over and beyond the external guide and contacting member, 3, and is shown as knurled for convenience in gripping. Preferably, there is a resilient relation between the parts, 3 and 4. In this instance, the resiliency is provided by a rubber ring or band, 7, between the top of the external member, 3, and the bottom side of the flange, 6. This provides a normal position of the central lower portion, 9, of the convex surface, 2, above the plane of the bottom edge, 8, of the contacting or outer telescoping member, 3, so that the edge, 8, being seated on the painted surface, the paint being soft, as already stated, at the time that the measurement is to be made, the rim, 6, which is preferably knurled being grasped in one hand and the outer telescoping or guiding member, 3, being grasped in the other hand to steady it, the convex member is forced down compressing the resilient member, 7, until the center or lowermost point, 4, of the convexity, passing through and displacing the paint, contacts the painted surface, 10, on which the lower edge, 8, of the outer guiding and contacting member, rests.

Referring now to Figures 5, 6, and 7, which are diagrammatic, Figure 5 illustrates the operation of an instrument having a frusto-conical or angular convex surface, and Figure 6 an instrument in which the lens has a spherical convex surface. Figure 7 may be treated as illustrating in plan either the angular convex, or conical or spherical convex instrument. In Figure 5, the thickness of the coat of paint being measured is represented by "$t$" or this may be treated as representing the tangent or sine of the angle as in small angles the tangent, the sine and the angle are practically equal. The angle of the convex or otherwise protuberant surface with the painted surface is indicated by $\alpha$. The radius of the area of contact of the paint with the lens, including not only the normal thickness of the paint but the portion of paint displaced is indicated by "$L$" which is the base of the triangle being measured, "$T$", being the altitude of the triangle having the base "$L$" and also representing the thickness of the coat plus the thickness of the portion of paint displaced at the circumference or outer edge of the area of contact between the lens and paint. i. e., "$L$" and $\alpha$, being known, to calculate "$t$" which is the thickness of the paint in a simple mathematical process.

Having reference to Figure 6, which relates to a lens having a spherical convex surface, "$t$" equals the thickness of the coat of paint; "$d$" equals the diameter of the zone of contact between the paint and the lens and "$p$" equals the radius of curvature of the spherical convex surface. With the quantities "$d$" and "$p$" known, the former being obtained by measurement of the zone of contact "$t$", the thickness of the coat of paint may be calculated by a simple mathematical formula as the following equation:

$$\left("t" = \frac{d^2}{16p}\right)$$

Figure 7 illustrates a convenient manner of measuring the zone of contact with the paint including the displaced portion when the convexed instrument is brought in contact as to the center of its convexity with the painted surface when the paint is soft or wet.

Figure 8 shows a possible method of graduation of the convex or protuberant member by which the thickness of the coat of paint may be measured direct and most conveniently. The convex member is of glass, i. e., a lens or prism any member having an inclined surface distinguishable from the spherical convex surface referred to, being included in the term prism as here used. The graduations as shown consist of concentric circles, 12, 13, etc., each circle being marked in fractions of an inch or in the preferred unit, the marks as in the present case being for the purpose of illustration reading in fractions of an inch of the thickness of the coat, $\frac{1}{1000}$ $\frac{2}{1000}$ $\frac{3}{1000}$ $\frac{4}{1000}$ etc.

The numbers are intended to indicate the thickness of the coat of paint corresponding to the line on or adjacent to which they are placed, i. e., when the contact zone including the displaced paints approaches any particular circle, the instrument being applied as indicated, the thickness of the paint may be read or determined from the corresponding mark of graduation. The graduations may be placed arbitrarily by experiment or by mathematical calculation.

The manner of operation of the instrument will be apparent from the description, the convex or angular member 2, being placed with its convex or angular surface in contact with and inclined upward from the painted surface, the paint being soft is displaced and the angle or convexity of the surface being known, the area of contact or smear bears a known or conveniently determinable relation to the thickness of the coat which is read either directly or by graduations placed by mathematical calculation or by experiment or arbitrarily as foresaid.

The paints to be treated are subject to a considerable variation. For instance, certain water paints are much more transparent when wet than when dry. This instrument is particularly effective in measuring paints or other coating materials when soft or wet. To determine the necessary thickness of a coat of paint to give complete hiding or covering with a paint which is less transparent, i. e., has greater hiding power when dry, it is necessary to paint a surface with a coating of graduated thickness, i. e., a portion of it having one coat, a portion having two coats, a portion having three coats, etc. then by measuring the thickness of each portion when the paint is wet and recording the thickness, the amount of paint necessary to form an opaque or non-transparent covering, becomes known, when the paint is dry, the satisfactory thickness being thus determined by observation of the dry paint.

I have thus described specifically and in detail a preferred embodiment of my invention with certain obvious modifications in order that the nature and operation of the device may be clearly understood; however, the specific terms herein are used descriptively rather than in a limiting sense, the scope of the invention being defined in the claims.

What I claim and desire to secure by Letters Patent is:

1. An instrument for measuring the thickness of a coating or layer of wet paint, consisting of a member having a surface of known convexity and means for supporting the convex member in a position in which a point on the convex surface is in contact with the painted surface, the convex surface serving to displace the paint and produce an extended zone of contact between the paint and the convex surface, said zone having a conveniently determinable relation to the thickness of the coating or layer.

2. An instrument for measuring the thickness of a layer of wet coating material, the instrument consisting of a transparent member having a surface of known convexity and means for supporting the transparent member with its surface in contact with the painted surface, causing a portion of the paint to be displaced and providing an extended and measurable zone of contact between the paint and the convex member, said sum bearing a known or determinable relation to the thickness of the coat.

3. An instrument for measuring the thickness of a coating of wet paint consisting of a member having a protuberant surface, means for supporting the said member with a portion of the protuberant surface in contact with the painted surface, producing a coated zone on the transparent member which bears a determinable relation to the thickness of the coating.

4. An instrument for measuring the thickness of a wet coating consisting of a transparent member having a surface of known convexity and means for supporting the transparent member with its surface in contact with and tangent to the coated surface, a portion of the coating being thus displaced and accumulated between the convex surface and the coated surface forming a zone of contact between the convex surface and the coating material proportionate to the thickness of the coating.

5. An instrument for measuring the thickness of a soft coating, consisting of a member having a protuberant surface and a support for the same, consisting of means for engaging the painted surface and means for holding the said member, said two means being adapted for relative motion, providing for contact of the protuberant surface with the painted surface, whether the painted surface be flat or irregular.

6. An instrument for measuring the thickness of a coating of material in a plastic condition, consisting of a member having a protuberant surface of known configuration, means for supporting said member consisting of a contact member adapted to engage the coated surface and a carrier for the protuberant member, the carrier being adapted to move relatively to the said contacting member, resilient means between said carrier and said contacting member, whereby the protuberant member may be brought into exact contact with the coated surface, displacing a portion of the coating and accumulating it, forming an extended zone of contact throughout which the protuberant member is coated, which zone of contact bears a determinable relation to the thickness of the coating.

Signed by me at Baltimore, Maryland, this 21st day of October, 1920.

AUGUST HERMAN PFUND.